United States Patent
Gao et al.

(10) Patent No.: US 11,595,829 B2
(45) Date of Patent: Feb. 28, 2023

(54) METHOD AND DEVICE FOR TRANSMITTING INFORMATION ELEMENT

(71) Applicant: ZTE Corporation, Shenzhen (CN)

(72) Inventors: Bo Gao, Shenzhen (CN); Yu Ngok Li, Shenzhen (CN); Zhaohua Lu, Shenzhen (CN); Ke Yao, Shenzhen (CN); Shujuan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 117 days.

(21) Appl. No.: 17/265,609

(22) PCT Filed: Aug. 8, 2019

(86) PCT No.: PCT/CN2019/099809
§ 371 (c)(1),
(2) Date: Feb. 3, 2021

(87) PCT Pub. No.: WO2020/030049
PCT Pub. Date: Feb. 13, 2020

(65) Prior Publication Data
US 2021/0297872 A1 Sep. 23, 2021

(30) Foreign Application Priority Data
Aug. 9, 2018 (CN) .................... CN2018109045932

(51) Int. Cl.
*H04W 16/28* (2009.01)
*H04W 72/04* (2023.01)
(Continued)

(52) U.S. Cl.
CPC ......... *H04W 16/28* (2013.01); *H04W 72/046* (2013.01); *H04W 72/0413* (2013.01);
(Continued)

(58) Field of Classification Search
CPC ............. H04W 16/28; H04W 72/0413; H04W 72/0446; H04W 72/0453; H04W 72/046;
(Continued)

(56) References Cited

U.S. PATENT DOCUMENTS

2017/0289995 A1* 10/2017 Lin .................. H04W 72/0413
2019/0281588 A1* 9/2019 Zhang .................. H04L 5/0051

FOREIGN PATENT DOCUMENTS

CA          3042828 A1      5/2018
CN         102656940 A      9/2012
(Continued)

OTHER PUBLICATIONS

International Search Report for corresponding application PCT/CN2019/099809 filed Feb. 13, 2020; dated Oct. 2019.
(Continued)

*Primary Examiner* — Thai Nguyen
(74) *Attorney, Agent, or Firm* — Cantor Colburn LLP

(57) ABSTRACT

Provided are a method and a device for transmitting an information element, and a method and a device for transmitting information. The method for transmitting an information element comprises: receiving, by a first communication node, spatial relationship information configured for multiple uplink information elements and transmitted by a second communication node, and transmitting, by the first communication node, the multiple uplink information elements according to the spatial relationship information. Further provided are a terminal, a storage medium and an electronic device.

20 Claims, 6 Drawing Sheets

(51) Int. Cl.
    *H04W 72/0446*   (2023.01)
    *H04W 72/0453*   (2023.01)
    *H04W 72/044*   (2023.01)
    *H04W 72/10*   (2009.01)

(52) U.S. Cl.
    CPC ... *H04W 72/0446* (2013.01); *H04W 72/0453* (2013.01); *H04W 72/10* (2013.01)

(58) Field of Classification Search
    CPC ... H04W 72/10; H04W 7/0469; H04W 7/063; H04W 7/0404; H04W 7/0628; H04W 7/0695; H04W 5/0091; H04W 74/004; H04W 74/08; H04W 28/0205; H04W 72/1242; H04W 76/15
    See application file for complete search history.

(56) References Cited

FOREIGN PATENT DOCUMENTS

| | | | |
|---|---|---|---|
| CN | 108024365 | A | 5/2018 |
| CN | 108092754 | A | 5/2018 |
| CN | 108093480 | A | 5/2018 |
| CN | 108111278 | A | 6/2018 |
| WO | 2018137577 | A1 | 8/2018 |
| WO | 2018127181 | A1 | 12/2018 |

OTHER PUBLICATIONS

European Search Report for corresponding application EP19846131; dated Aug. 25, 2021.

\* cited by examiner

METHOD AND DEVICE FOR TRANSMITTING INFORMATION ELEMENT

CROSS-REFERENCE TO RELATED APPLICATIONS

The present disclosure claims priority to Chinese Patent Application No. 201810904593.2 filed to the China National Intellectual Property Administration on Aug. 9, 2018, the entirety of which is herein incorporated by reference.

TECHNICAL FIELD

The present disclosure relates to, but not limited to, the field of communications, and in particular to a method and a device for transmitting an information element.

BACKGROUND

In the related art, a high frequency band with an ultra-wide bandwidth (i.e. millimeter wave communication) becomes an important direction for the development of future mobile communications, and attracts the attention of global academic circles and industrial circles.

Especially, with the access of a large number of increasingly congested spectrum resources and physical networks nowadays, the advantages of the millimeter wave become increasingly attractive, and the corresponding standardization work begins to be developed in many standard organizations, such as IEEE and 3GPP. For example, in the 3GPP standards group, communication of high-frequency band will become an important innovative point of the 5G new radio access technology (New RAT) by means of its large bandwidth.

For a base station, it may have some antenna panels, and each antenna panel may generate some beams. Similar situations exist for the UE end. Therefore, a receiving method for a reference signal, a data channel, and a control channel under multiple beams in a mixed situation of an analog domain and a digital domain needs to be provided.

For the problem in the related art that collisions exist while transmitting uplink information elements, there is no effective solution at present.

SUMMARY

The embodiments of the present disclosure provide a method and a device for transmitting an information element, for at least solving the problem in the related art that a collision exists when an uplink information element is transmitted.

According to an embodiment of the present disclosure, provided is a method for transmitting an information element, comprising: receiving, by a first communication node, spatial relationship information configured for multiple uplink information elements and transmitted by a second communication node; and transmitting the multiple uplink information elements according to the spatial relationship information.

According another embodiment of the present disclosure, further provided is a method for transmitting information, comprising: determining, by a second communication node, spatial relationship information configured for multiple uplink elements of a first communication node; and transmitting the spatial relationship information to the first communication node.

According to another embodiment of the present disclosure, further provided is a device for transmitting an information element, comprising: a receiving module, configured to receive spatial relationship information configured for multiple uplink information elements and transmitted by a second communication node; and a first transmission module, configured to transmit the multiple uplink information elements according to the spatial relationship information.

According to an embodiment of the present disclosure, further provided is a device for transmitting information, comprising: a determination module, configured to determine spatial relationship information configured for multiple uplink elements of a first communication node; and a second transmission module, configured to transmit the spatial relationship information to the first communication node.

According to another embodiment of the present disclosure, further provided is a terminal, comprising: a communication device, configured to receive spatial relationship information configured for multiple uplink information elements and transmitted by a second communication node; and a processor, configured to transmit the multiple uplink information elements according to the spatial relationship information.

According to another embodiment of the present disclosure, further provided is a storage medium. The storage medium stores a computer program, and the computer program is configured to execute the steps in any one of the method embodiments during running.

According to another embodiment of the present disclosure, further provided is an electronic device, comprising a memory and a processor, and the memory stores a computer program, and the processor is configured to run the computer program, so as to execute the steps in any one of the method embodiments.

In the above embodiments of the present disclosure, a first communication node receives spatial relationship information configured for multiple uplink information elements and transmitted by a second communication node, and transmits the multiple uplink information elements according to the spatial relationship information, By means of the technical solution, uplink information elements are transmitted according to spatial relationship information configured by the second communication node, the problem in the related art that a collision exists when uplink information elements are transmitted is solved, and as the second communication node uniformly sets the transmitted spatial relationship information, the collision between uplink information elements is reduced, and the utilization efficiency of the transceiver and antenna resources is improved.

BRIEF DESCRIPTION OF THE DRAWINGS

The drawings illustrated herein are intended to provide a better understanding of the present disclosure, and constitute a part of the present disclosure. The schematic embodiments of the present disclosure and the description thereof are used to explain the present disclosure, but not to limit the present disclosure improperly. In the drawings.

DETAILED DESCRIPTION OF THE EMBODIMENTS

The present disclosure will be described in detail below using some embodiments with reference to the accompanying drawings. It should be noted that, the embodiments of the disclosure and the features of the embodiments can be combined when no conflict is caused.

It should be noted that, the terms "first", "second", etc. in the description, claims and drawings of the present disclosure are used to distinguish similar objects, but are not necessarily used to describe a specific sequence or order.

Embodiment One

A mobile communication network (comprising but not limited to a 5G mobile communication network) is provided by an embodiment of the present disclosure. The network architecture of the network may comprise a network side device (for example, a base station) and a terminal. Some embodiments of the present disclosure provide a method for transmitting information that can operate on the network architecture. It should be noted that the operating environment of the method for transmitting information provided in the embodiments of the present disclosure is not limited to the network architecture.

Figure 1:
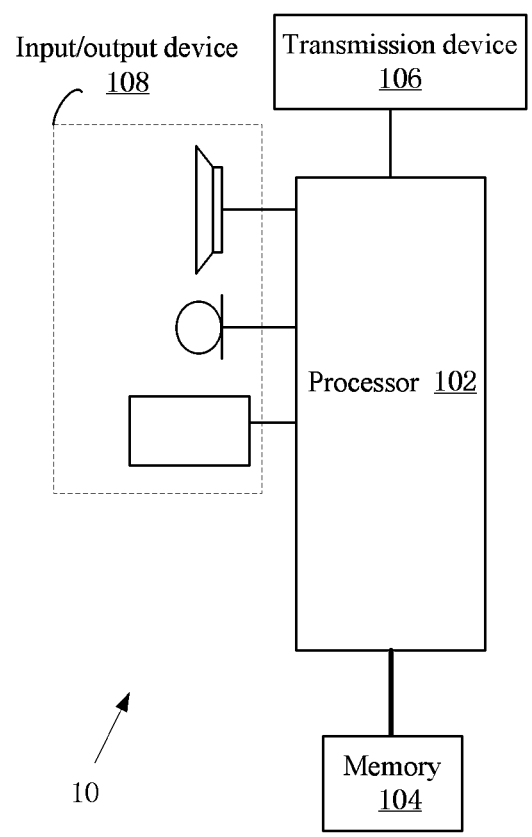
FIG. 1 is a structural block diagram of hardware of a mobile terminal of a method for transmitting an information element according to an embodiment of the present disclosure.

The method embodiment provided in the embodiments of the present disclosure may be executed in a mobile terminal, a computer terminal, or a similar computing device. Taking the operation on a mobile terminal as an example, FIG. 1 is a structural block diagram of hardware of a mobile terminal of a method for transmitting an information element according to some embodiments of the present disclosure. As shown in FIG. 1, a mobile terminal 10 may comprise one or more processors 102 (only one is shown in FIG. 1) (the processor 102 may include, but is not limited to, a processing device such as a microprocessor (MCU) or a programmable logic device (FPGA)) and a memory 104 for storing data. In an embodiment, the mobile terminal can further comprise a transmission device 106 for a communication function and an input/output device 108. Those ordinarily skilled in the art can appreciate that the structure shown in FIG. 1 is for illustrative purposes only, but not limit the structure of the mobile terminal. For example, the mobile terminal 10 may also comprise more or fewer components than that shown in FIG. 1, or have a different configuration than that shown in FIG. 1.

The memory 104 can be used for storing software programs and modules of application software, such as program instructions/modules corresponding to the method for transmitting an information element in the embodiments of the present disclosure; and the processor 102 runs the software programs and modules stored in the memory 104, so as to execute various function applications and data processing, i.e. to implement the method. The memory 104 may comprise a high-speed random access memory, and may also comprise non-transitory memories, such as one or more magnetic storage devices, flash memories, or other non-transitory solid-state memories. In some instances, the memory 104 may further comprise a memory remotely located from the processor 102, and the remote memory may be connected to the mobile terminal 10 by a network. Examples of the network above comprises, but is not limited to, an Internet, intranets, a local area network, a mobile communication network, and combinations thereof.

The transmission device 106 is configured to receive or transmit data via a network. Specific examples of the network may comprise a wireless network provided by a communication provider of the mobile terminal 10. In some examples, the transmission device 106 may comprise a network interface controller (NIC) that may be coupled to other network devices by a base station, so as to communicate with the Internet. In some examples, the transmission device 106 may be a radio frequency (RF) module for communicating wirelessly with the Internet.

Figure 2:
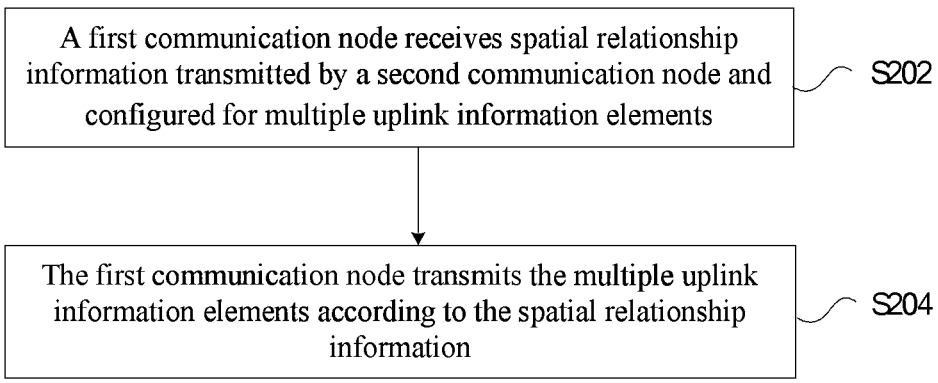
FIG. 2 is a flowchart of a method for transmitting an information element according to an embodiment of the present disclosure.

The present embodiment provides a method for transmitting an information element operating on the mobile terminal. FIG. 2 is a flowchart of a method for transmitting an information element according to some embodiments of the present disclosure. As shown in FIG. 2, the flow comprises the following steps:

step S202, a first communication node receives spatial relationship information transmitted by a second communication node and configured for multiple uplink information elements;

the first communication node may be a terminal, and the second communication node may be a base station, but is not limited thereto; and step S204: the multiple uplink information elements are transmitted according to the spatial relationship information.

By means of the steps above, a first communication node receives spatial relationship information configured for multiple uplink information elements and transmitted by a second communication node, and transmits the multiple uplink information elements according to the spatial relationship information, By means of the technical solution, uplink information elements are transmitted according to spatial relationship information configured by the second communication node, the problem in the related art that a collision exists when uplink information elements are transmitted is solved, and as the second communication node uniformly sets the transmitted spatial relationship information, the collision between uplink information elements is reduced, and the utilization efficiency of the transceiver and antenna resources is improved.

In an embodiment, the uplink information elements comprise at least one of the following: an uplink reference signal, an uplink data channel and an uplink control channel.

In an embodiment, when the uplink information element is an uplink data channel, the spatial relationship information comprises at least one of the following: spatial relationship information configured for an uplink reference signal associated with the uplink data channel; and spatial relationship information configured for an uplink control channel associated with the uplink data channel.

In an embodiment, the multiple uplink information elements have at least one of features:

the multiple uplink information elements being transmitted at the same time, which can be understood as sending multiple uplink information elements at the same time;

the multiple uplink information elements being associated with the same time unit; and the time units associated with the multiple uplink information elements partially or fully overlapping;

the time unit is an orthogonal frequency division multiplexing (OFDM) symbol, or a sub-OFDM symbol, or a sub-frame slot.

In an embodiment, when the parameter X of the uplink information element is greater than a threshold, transmitting the multiple uplink information elements according to the spatial relationship information comprises:

processing the multiple uplink information elements according to a priority criterion, and the step of processing the multiple uplink information elements according to the priority criterion comprises at least one of the following:

the spatial relationship of low-priority uplink information elements being overlapped into a specific spatial relationship;

the spatial relationship of all the uplink information elements being overlapped into a specific spatial relationship;

the low-priority uplink information elements being transmitted by a specific spatial filter;

the spatial relationship of all the uplink information elements being transmitted by the specific spatial filter; and the low-priority uplink information elements being not transmitted;

the parameter X is an integer.

In an embodiment, the parameter X of the uplink information element comprises at least one of the following:

the number of spatial relationships associated with the uplink information elements;

the number of different spatial relationships associated with the uplink information elements;

the number of spatial relationships of the same group associated with the uplink information elements;

the maximum number of spatial relationships of the same group associated with the uplink information elements;

the number of groups associated with the uplink information elements; and the number of different groups associated with the uplink information element, which may have the same meaning as the number of groups associated with the uplink information elements.

In an embodiment, the parameter X of the uplink information element comprises at least one of the following:

the number of spatial filters associated with the uplink information elements;

the number of different spatial filters associated with the uplink information elements;

the number of spatial filters of the same group associated with the uplink information elements; and the maximum number of spatial filters of the same group associated with the uplink information elements.

In an embodiment, after the multiple uplink information elements are processed according to the priority criterion, it is determined that the parameter X is less than or equal to the threshold.

In an embodiment, the specific spatial relationship may comprise at least one of the following:

a spatial relationship pre-configured by a high layer;

a spatial relationship of high-priority uplink information elements;

a spatial relationship of a lowest index, a highest index or N predefined indexes among preset indexes;

a spatial relationship of a primary carrier index or a primary cell index;

a spatial relationship of a lowest index, a highest index, or M predefined indexes in preset indexes associated with the low-priority uplink information elements;

a spatial relationship of a primary carrier or a primary cell associated with the low-priority uplink information elements;

a spatial relationship associated with a lowest index, a highest index or P pre-defined indexes among preset indexes associated with a group associated with the low-priority uplink information elements;

a spatial relationship associated with a primary carrier or a primary cell associated with a group associated with the low-priority uplink information elements;

a spatial relationship of high-priority uplink information elements associated with a same group with the low-priority uplink information elements;

a spatial relationship associated with a reference signal (RS) in spatial relationship information of the low-priority uplink information elements; and a spatial relationship associated with a reference signal in spatial relationships of the information elements;

the preset index comprising at least one of the following: a cell index, a carrier index, a Bandwidth part (BWP) index, a control channel resource set index and a control channel resource index, and N, M and P are positive integers greater than or equal to 1.

In an embodiment, a spatial relationship of the low-priority uplink information elements is associated with a group index Y;

in a case of the low-priority uplink information elements, the number of spatial relationships associated with the group index Y is greater than the threshold; or in a case of the low-priority uplink information elements, the number of different spatial relationships associated with the group index Y is greater than the threshold, Y is an integer.

In an embodiment, the specific spatial filter may comprise at least one of the following:

a spatial filter pre-configured by a high layer;

a spatial filter used by high-priority uplink information elements;

a spatial filter of a lowest index, a highest index, or specific Q predefined indexes among the preset indexes;

a spatial filter of a primary carrier index or a primary cell index;

a spatial filter of a lowest index, a highest index or specific R predefined indexes among preset indexes associated with the low-priority uplink information elements;

a spatial filter of a primary carrier index or primary cell index associated with the low-priority uplink information elements;

a spatial filter associated with a lowest index, a highest index or specific S pre-defined indexes among preset indexes associated with a group associated with the low-priority uplink information elements;

a spatial filter associated with a primary carrier index or a primary cell index and associated with a group associated with the low-priority uplink information elements;

a spatial filter of high-priority uplink information elements associated with a same group with the low-priority uplink information elements;

a spatial filter associated with a reference signal in spatial relationship information of the low-priority uplink information elements;

a spatial filter associated with a reference signal in spatial relationships with the information elements; and the preset index comprising at least one of the following: a cell index, a carrier index, a Bandwidth part (BWP) index, a control channel resource set index and a control channel resource index, R, Q, S being positive integers greater than or equal to 1.

In an embodiment, a spatial filter of the low-priority uplink information elements is associated with a group index W, in a case of the low-priority uplink information elements, the number of spatial filters associated with the group index W is greater than the threshold; or in a case of the low-priority uplink information elements, the number of different spatial filters associated with the group index W is greater than the threshold, W being an integer.

In an embodiment, the threshold comprises one of the following: 1, 2, 3 and 4.

In an embodiment, the threshold is determined according to capability information and/or configuration information of the first communication node, the configuration information being configured by the second communication node.

In an embodiment, the priority criterion may comprise at least one of the following:

an uplink data channel has priority over an uplink reference signal;

an uplink data channel has priority over an uplink control channel;

a multi-slot uplink data channel has priority over an uplink control channel;

a multi-slot uplink data channel has priority over an uplink reference signal;

an uplink reference signal has priority over an uplink control channel;

a grant-based uplink data channel has priority over a grant-free-based uplink data channel; and the information elements under the primary cell or primary carrier taking precedence over the information elements under the secondary cell or secondary carrier.

In an embodiment, the priority criterion may comprise at least one of the following:

an uplink control channel has priority over an uplink reference signal;

an uplink control channel has priority over an uplink data channel;

an uplink reference signal has priority over an uplink data channel; and a grant-based uplink data channel has priority over a grant-free-based uplink data channel.

In an embodiment, the priority criterion may comprise at least one of the following: an aperiodic uplink information element has priority over a periodic uplink information element;

the aperiodic uplink information element has priority over a semi-persistent uplink information element;

the semi-persistent uplink information element has priority over the periodic uplink information element.

In an embodiment, the priority criterion may comprise at least one of the following: determining the priority of an uplink information element according to a reference signal index;

determining the priority of an uplink information element according to a control channel resource set index;

determining the priority of an uplink information element according to a type or a sequence number of a radio network temporary identifier (RNTI); and determining the priority of an uplink information element according to a bandwidth part (BWP) index, a carrier index or a cell index.

Figure 3:
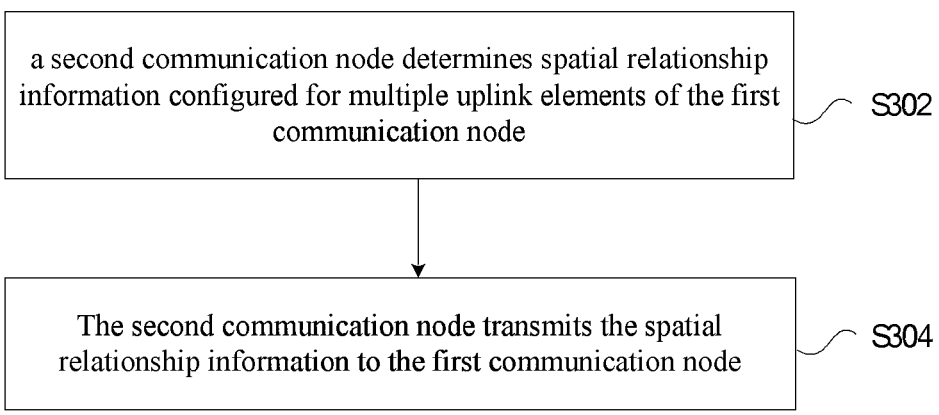
FIG. 3 is a flowchart of a method for transmitting information according to an embodiment of the present disclosure.

FIG. 3 is a flowchart of a method for transmitting information according to some embodiments of the present disclosure, and as shown in FIG. 3, the method comprises the following steps:

step S302, determining, by a second communication node, spatial relationship information configured for multiple uplink elements of a first communication node; and step S304: transmitting the spatial relationship information to the first communication node.

By means of the technical solution, the problem in the related art that a collision exists when uplink information elements are transmitted is solved, and as the second communication node uniformly sets the transmitted spatial relationship information, the collision between uplink information elements is reduced, and the utilization efficiency of the transceiver and antenna resources is improved.

In an embodiment, after the spatial relationship information is transmitted to the first communication node, the second communication node receives uplink information elements transmitted by the first communication node according to the spatial relationship information.

In an embodiment, the uplink information elements include at least one of the following: an uplink reference signal, an uplink data channel and an uplink control channel.

In an embodiment, when the uplink information element is an uplink data channel, the spatial relationship information comprises at least one of the following: spatial relationship information configured for an uplink reference signal associated with the uplink data channel; and spatial relationship information configured for an uplink control channel associated with the uplink data channel.

In an embodiment, the multiple uplink information elements have at least one of features: transmitting the multiple uplink information elements at the same time; the multiple uplink information elements being associated with the same time unit; and the time units associated with the multiple uplink information elements partially or fully overlapping, the time unit is an orthogonal frequency division multiplexing (OFDM) symbol, or a sub-orthogonal frequency division multiplexing (sub-OFDM) symbol, or a sub-frame slot.

Description will be given below with reference to some other embodiments of the present disclosure.

In a new wireless 5G communication system in the related art, at the same moment, simulated beams are assumed to be collision-free, but, with the increase of the antenna panels at the UE end and the base station end, the channel and reference signals having different spatial relationships or using different uplink transmission spatial filters may be transmitted at the same time in the case of different antenna panels, and therefore, there is a need to create a criterion to release the flexibility of grant of the base station.

In the case of a multi-antenna panel is supported, a constraint method for configuring a spatial relationship of an uplink reference signal, an uplink control channel, and an uplink data channel, and a training method for a multi-antenna panel are created. In an embodiment, while ensuring that capability information at a terminal UE end (also referred to as a first communication node in the present disclosure) and/or configuration information at a base station (also referred to as a second communication node in the present disclosure) are satisfied, provided are a method for reasonably avoiding a collision, and a back-off criterion for a first communication node when a collision occurs.

Specifically, in the case of cross-carrier or cell, the combination of uplink reference signals or channel collisions that may occur is as follows:

Physical uplink control channel (PUCCH)+PUCCH;
Physical uplink shared channel (PUSCH)+PUSCH;
SRS+SRS;
PUCCH+PUSCH;
PUCCH+SRS;
PUSCH+SRS;

In an embodiment, PUCCH+PUCCH and PUCCH+PUSCH only occur if they are from different cell groups, respectively, and the remaining combinations may be signal or channel collisions between different cells or may be signal or channel collisions of the same cell.

In some embodiments of the present disclosure, the group comprises at least one of the following: a type-A group, a type-B group and a type-C group.

The type-A group is referred to as an antenna panel, a panel, or an antenna array; the type-B group is referred to as a sub-antenna panel, a sub-panel, or a sub-antenna array; and the type-C group is referred to as a beam group.

In an embodiment, the grouping criterion for the type-A group may comprise at least one of the following:

1 reference signals or channels associated with different groups may be transmitted at the same time;
2 reference signals or channels associated with different groups may be received at the same time;
3 reference signals or channels associated with the same type-C group cannot be sent at the same time, or reference signals or channels associated with the same group and having different spatial relationships or different spatial filters cannot be sent at the same time;
4: reference signals or channels associated with the same group cannot be received at the same time, or reference signals or channels associated with the same group and having different spatial relationships or different spatial filters cannot be received at the same time;

or, the grouping criterion for the type-A group comprises at least one of the following:

1 no more than E reference signals or channels associated with the same group can be sent at the same time, or no more than E reference signals or channels associated with the same group and having different spatial relationships or different spatial filters can be sent at the same time;
2 more than E reference signals or channels associated with the same group cannot be sent at the same time, or more than E reference signals or channels associated with the same group and having different spatial relationships or different spatial filters cannot be sent at the same time;
3 no more than E reference signals or channels associated with the same group can be received at the same time, or no more than E reference signals or channels associated with the same group and having different spatial relationships or different spatial filters can be received at the same time;
4 more than E reference signals or channels associated with the same group cannot be received at the same time, or that more than E reference signals or channels associated with the same group and having different spatial relationships or different spatial filters cannot be received at the same time;
5 the group includes E type-B groups;
herein E is an integer greater than or equal to 1.

In an embodiment, the grouping criterion for the type-B group may comprise at least one of the following:

1 reference signals or channels associated with different groups may be transmitted at the same time;
2 reference signals or channels associated with different groups may be received at the same time;
3 reference signals or channels associated with the same group cannot be sent at the same time, or reference signals or channels associated with the same group and having different spatial relationships or different spatial filters cannot be sent at the same time;
4 reference signals or channels associated with the same group cannot be received at the same time, or reference signals or channels associated with the same group and having different spatial relationships or different spatial filters cannot be received at the same time.

In an embodiment, the grouping criterion for the type-C group may comprise at least one of the following:

1 reference signals or channels associated with different groups cannot be transmitted at the same time;
2 reference signals or channels associated with different groups cannot be received at the same time;
3 reference signals or channels associated with the same group may be sent at the same time, or reference signals or channels associated with the same group and having different spatial relationships or different spatial filters can be sent at the same time;
4 reference signals or channels associated with the same group can be received at the same time, or reference signals or channels associated with the same group and having different spatial relationships or different spatial filters can be received at the same time.

In some embodiments of the present disclosure, the capability information comprises at least one of the following:

1 the number of type-A groups of a first communication node;
2 the number of type-B groups under the type-A groups of the first communication node;
3 the number of uplink information elements sent at the same time, or the maximum number of uplink information elements sent at the same time;
4 the number of sets of uplink reference signal resources for beam management, or the maximum number of sets of uplink reference signal resources for beam management;
5 the number of downlink information elements received at the same time, or the maximum number of downlink information elements received at the same time;
6 the number of channel profile assumptions of the downlink information elements received at the same time, or the maximum number of channel profile assumptions of the downlink information elements received at the same time;
7 the number of downlink information elements of different channel profile assumptions received at the same time, or the maximum number of downlink information elements of different channel profile assumptions received at the same time;
8 the number or maximum number of uplink demodulation reference signal (DMRS) port groups, or the number or maximum number of uplink DMRS port groups in a joint transmission mode;
9 the number or maximum number of PUCCH groups, or the number or maximum number of cell groups;

10 the capability information of downlink information elements received at the same time;

11 the capability information of uplink information elements sent at the same time;

12 the capability information about supporting multiple DMRS groups.

In some embodiments of the present disclosure, the second communication node configuration information comprises at least one of the following:

1 the value of the threshold;

2 the number of type-A groups of the second communication node;

3 the number of type-B groups under the type-A groups of the second communication node;

4 the number of spatial relationships of the uplink information elements sent at the same time or the maximum number of spatial relationships of the uplink information elements sent at the same time;

5 the number of uplink information elements sent at the same time and having different spatial relationships, or the maximum number of uplink information elements sent at the same time and having different spatial relationships;

6 the number of uplink information elements sent at the same time and having different spatial relationships, or the maximum number of uplink information elements sent at the same time and having different spatial relationships;

7 the number or maximum number of uplink DMRS port groups, or the number or maximum number of uplink DMRS port groups in a joint transmission mode;

8 the number or maximum number of PUCCH groups, or the number or maximum number of cell groups;

9 the mode of the uplink information elements sent at the same time being valid;

10 the mode of multiple-uplink DMRS group being valid.

The uplink reference signal in some embodiments of the present disclosure comprises at least one of the following:

1 sounding reference signal (SRS);

2 phase-tracking reference signal (PT-RS);

3 demodulation reference signal (DMRS).

The downlink reference signal in some embodiments of the present disclosure is at least one of the following:

1 channel state information reference signal (CSI-RS);

2 phase-tracking reference signal (PT-RS);

3 synchronization signal block (SSB);

4 synchronization signal/physical broadcast channel (SS/PBCH);

5 downlink demodulation reference signal (DMRS); and

6 CSI-RS for tracking.

A spatial relationship, also referred to as spatial relationship information, carries one or more reference signals to represent or indicate an uplink spatial filter of an associated reference signal or channel (also referred to as a target reference signal or a target channel). In an embodiment, a reference signal or a channel (also referred to as a target reference signal or a target channel) is configured with spatial relationship information, so that the UE determines an uplink spatial filter of the reference signal or the channel.

In an embodiment, the spatial relationships being different indicate that reference signals in spatial relationships associated with multiple reference signals or channels are different.

In an embodiment, the spatial relationships being the same indicates that reference signals in spatial relationships associated with multiple reference signals or channels are the same or the same as the reference signals themselves.

In an embodiment, when the spatial relationship information is configured for the reference signals, the reference signal under the associated spatial relationship is a reference signal of one or more pieces of nested spatial relationship information.

The reference signal is composed of at least one of the following: a reference signal resource index, a reference signal set index, a reference signal configuration index, or a group index.

The channel profile assumption may be one or more of: QCL (QCL), spatial quasi-co-location (spatial QCL), transmission configuration indication (TCI), spatial filter information, antenna group information, and reference signal set. The QCL is composed of one or more reference signals and QCL parameters associated with the reference signals, the QCL parameters at least comprise one or a combination of the following: Doppler spread, Doppler shift, delay spread, average delay, average gain and spatial parameters; further, the spatial parameters may comprise a spatial receiving parameters, such as, an angle of arrival, a spatial correlation of receiving beams, an average delay, and a correlation of a time-frequency channel response (comprising phase information). In an embodiment, the QCL is composed of one or more RS sets, and each RS set comprises one or more RSs (RS) and QCL parameters associated with the RS. The spatial filter information may be spatial filter configuration information that the base station expects the UE to implement, and may also be spatial filter configuration information of the base station itself.

In an embodiment, the channel profile assumptions are different, and the difference of space parameters may be only considered, that is, if the TCI comprises two reference signals, whether reference signals associated with the spatial parameters are the same or not is only considered as a criterion for determining whether they are the same or not.

The RS comprises at least one of the following: a reference signal resource index, a reference signal set index, a reference signal configuration index, or a group index.

The beam may be a resource (e.g., a transmission-end spatial filter, a receiving-end spatial filter, a transmission-end precode, a receiving-end precode, an antenna port, an antenna weight vector, an antenna weight matrix, etc.), and the beam sequence number can be replaced with a resource index (e.g., a reference signal resource index), because the beam can be bound to time-frequency code resources for transmission. The beam may also be a transmission (sending/receiving) mode; the transmission modes may comprise space division multiplexing, frequency domain/time domain diversity, etc.

According to some embodiments of the present disclosure, a method for sending an uplink information element is provided, and the method is applied to a first communication node. The method comprises the following steps:

the spatial relationship information configured for an uplink information element and sent by a second communication node is received, and a sending mode of the uplink information element is determined, the information element comprises at least one of the following: A1 reference signals, A2 data channels and A3 control channels, A1, A2 and A3 being integers greater than or equal to 1.

In an embodiment, when the uplink information element is an uplink data channel, the spatial relationship information configured for the uplink element comprises at least one of the following:

the spatial relationship information associated with the uplink data channel and configured for an uplink reference signal, and spatial relationship information associated with the uplink data channel and configured for an uplink control channel.

In an embodiment, the uplink information element may have at least one of following features:

0 transmitting at the same time;

1 sending by a first communication node at the same time;

2 associating identical time units, or the associated time units partially or fully overlapping, the time unit is an OFDM symbol, a sub-OFDM symbol, or a slot.

After a collision occurs to the uplink information elements, the following processing is performed:

when the parameter X of the information element is greater than a threshold, according to a priority criterion, comprising at least one of the following:

1 the spatial relationships of low-priority information elements being overlapped into a specific spatial relationship, or the spatial relationships of all the information elements being overlapped into a specific spatial relationship;

2 the low-priority information elements being sent by a specific spatial filter, or the spatial relationship of the information elements being sent by the specific spatial filter;

3 the low-priority elements being not sent.

The parameter X of the information element may comprise at least one of the following:

1 the number of spatial relationships of the information elements, or the number of different spatial relationships of the information elements;

2 under the information elements, the number of spatial relationships associated with the same group, or the maximum number of spatial relationships associated with the same group;

3 the number of associated groups, or the number of associated different groups.

In addition, the parameter X of the information element may comprise at least one of the following:

1 the number of spatial filters associated with the information elements, or the number of different spatial filters of the information elements;

2 under the information elements, the number of spatial filters associated with the same group, or the maximum number of spatial filters associated with the same group;

in an embodiment, after the method is executed, the parameter X may be enabled to be smaller than or equal to the threshold.

The threshold comprises one of the following: 1, 2, 3 and 4, and/or the threshold is determined by the capability information of the first information node and/or configuration information of the second communication node.

The specific spatial relationship in the present disclosure comprises at least one of the following:

0 a spatial relationship pre-configured by a high layer;

1 a spatial relationship of high-priority elements;

2 a spatial relationship of a lowest index, a highest index or N indexes among preset indexes, or a spatial relationship of primary carrier or cell indexes;

3 a spatial relationship of a lowest index, a highest index, or specific N indexes associated with the low-priority elements, or a spatial relationship of primary carriers or primary cells associated with the low-priority elements;

4 a spatial relationship associated with a lowest index, a highest index or specific N indexes associated with a group associated with the low-priority elements;

5 a spatial relationship associated with a primary carrier or a primary cell associated with a group associated with the low-priority elements;

6 a spatial relationship of high-priority uplink information elements of the same group associated with the low-priority elements;

7 a spatial relationship associated with a RS in spatial relationship information of the low-priority elements;

8 a spatial filter associated with a RS in spatial relationships with the information elements;

the preset index comprising at least one of the following: a cell index, a carrier index, a Bandwidth part (BWP) index, a control channel resource set index and a control channel resource index;

N is a positive integer greater than or equal to 1.

In an embodiment, low-priority elements need to satisfy the following constraints:

the spatial relationship of the low-priority elements is associated with a group index X, for the information elements, the number of spatial relationships associated with the group index X is greater than the threshold, or for the information elements, the number of different spatial relationships associated with the group index X is greater than the threshold.

The spatial filter in the disclosure above comprises at least one of the following:

0 a spatial filter pre-configured by a high layer;

1 a spatial filter of high-priority elements;

2 a spatial filter of a lowest index, a highest index or N indexes among preset indexes, or a spatial filter of primary carrier or cell indexes;

3 a spatial filter of a lowest index, a highest index, or specific N indexes associated with the low-priority elements, or a spatial filter of primary carriers or primary cells associated with the low-priority elements;

4 a spatial filter associated with a lowest index, a highest index or specific N indexes associated with a group associated with the low-priority elements;

5 a spatial filter associated with a primary carrier or a primary cell associated with a group associated with the low-priority elements;

6 a spatial filter of high-priority uplink information elements of the same group associated with the low-priority elements;

7 a spatial filter associated with a RS in spatial relationship information of the low-priority elements;

8 a spatial filter associated with a reference signal in spatial relationships with the information elements;

the preset index comprising at least one of the following: a cell index, a carrier index, a Bandwidth part (BWP) index, a control channel resource set index and a control channel resource index, and herein N is a positive integer greater than or equal to 1.

In an embodiment, low-priority elements need to satisfy the following constraints:

the spatial filter of the low-priority elements is associated with a group index X, for the information elements, the number of spatial filters associated with the group index X is greater than the threshold, or under the information elements, the number of different spatial filters associated with the group index X is greater than the threshold.

The priority criterion in some embodiments of the present disclosure comprises at least one of the following:

0 an uplink data channel has priority over an uplink reference signal;

1 an uplink data channel has priority over an uplink control channel;

2 a multi-slot uplink data channel has priority over an uplink control channel;

3 an uplink reference signal has priority over an uplink control channel;

4 a grant-based uplink data channel has priority over a grant-free-based uplink data channel; and

5 the information elements under the primary cell or primary carrier taking precedence over the information elements under the secondary cell or secondary carrier;

In an embodiment, the priority criterion comprises at least one of the following:

1 an uplink control channel has priority over an uplink reference signal;

2 an uplink control channel has priority over an uplink data channel; and

3 a grant-free-based uplink data channel has priority over a grant-based uplink data channel.

In an embodiment, the priority criterion comprises at least one of the following:

1 a non-periodic reference signal has priority over a periodic reference signal;

2 a non-periodic reference signal has priority over a semi-persistent reference signal;

3 a semi-persistent reference signal has priority over a periodic reference signal;

In an embodiment, the priority criterion comprises at least one of the following:

1 determining a priority according to a reference signal index;

2 determining a priority according to a control channel resource set index;

3 determining a priority according to the type or sequence number of an RNTI; and

4 determining a priority according to a BWP index, a carrier index, or a cell index.

In an embodiment, the lowest index, the highest index or a particular index has a higher priority.

Figure 4:
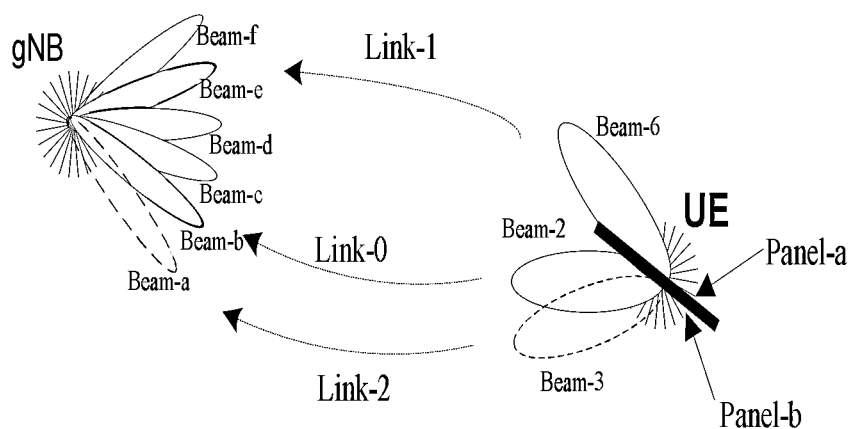
FIG. 4 is a schematic diagram of an uplink multi-beam transmission according to an embodiment of the present disclosure.

FIG. 4 is a schematic diagram of an uplink multi-beam transmission according to some embodiments of the present disclosure. As shown in FIG. 4, in uplink transmission, a UE end has two panels, and can send two beams from different panels at the same time, which are referred to as panel-a and panel-b. From the perspective of grouping, the UE end has two type-A groups, and the grouping criterion is specifically as follows:

the reference signals or channels associated with different groups may be sent at the same time;

the reference signals or channels associated with the same group and having different spatial relationships cannot be sent at the same time;

for Panel-a, also referred to as UE Antenna Group-a (UAG-a), there is an effective communication link which forms uplink Link-1 by means of Beam-6 at the UE end and Beam-e at the base station end. However, for Panel-b, also referred to as UAG-b, there are two valid communication links, Link-0 and Link-2, Link-0 is constructed by Beam-2 of the UE end and Beam-b of the base station end, and Link-2 is constructed by Beam-3 of the UE end and Beam-a of the base station end.

In an embodiment, according to the capability of the UE, Link-1 and Link-0/2 can be transmitted at the same time, but Link-0 and Link-2 cannot be transmitted at the same time.

In an embodiment, from a standard perspective, the beam corresponds to a reference signal index.

Figure 5:
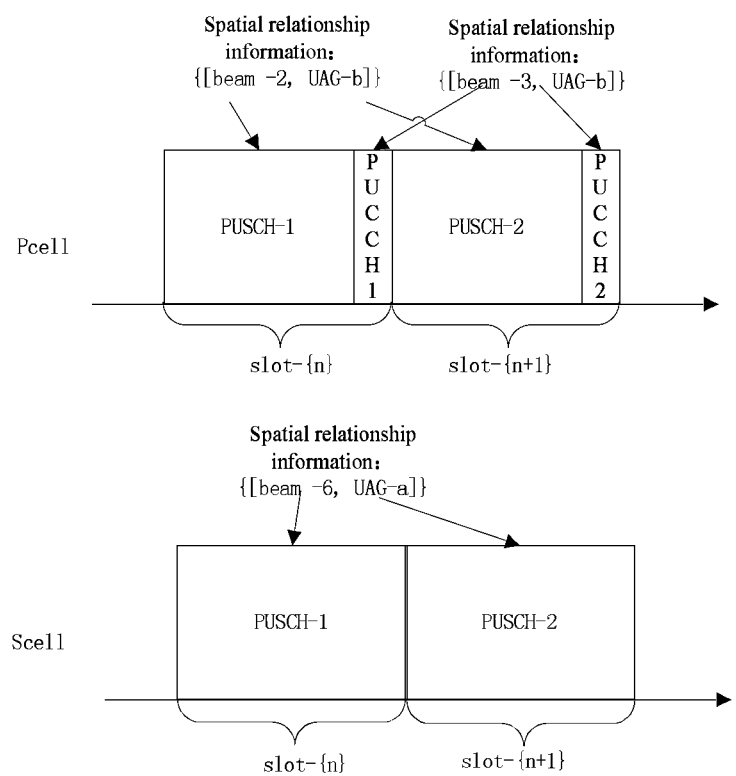
FIG. 5 is a schematic diagram of a collision of spatial relationship information of a physical layer uplink shared channel and a physical layer uplink control channel according to an embodiment of the present disclosure.

FIG. 5 is a schematic diagram of a collision of spatial relationship information of a physical layer uplink shared channel and a physical layer uplink control channel according to some embodiments of the present disclosure. As shown in FIG. 5, in consideration of transmission scenarios of a Pcell and an Scell, the Pcell and the Scell are respectively associated with different UAGs during Slot-{n} and Slot-{n+1}. Thus, the grant transmission of the Pcell and the Scell will not conflict with each other beyond the capability of the UE. Therefore, both the Pcell and the Scell may perform transmission of uplink control channels and uplink data channels according to respective configurations. A physical uplink shared channel (PUSCH), and a physical uplink control channel (PUCCH).

Figure 6:
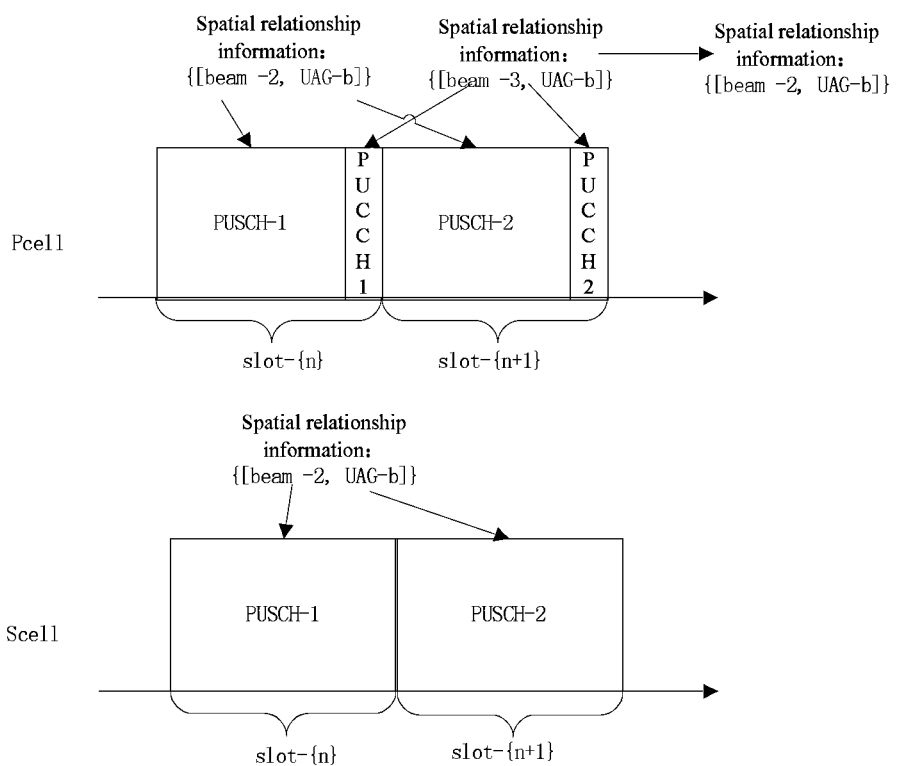
FIG. 6 is a schematic diagram of a collision of spatial relationship information of a physical layer uplink shared channel and a physical layer uplink control channel according to an embodiment of the present disclosure.

FIG. 6 is a schematic diagram of a collision of spatial relationship information of a physical layer uplink shared channel and a physical layer uplink control channel according to some other embodiments of the present disclosure, as shown in FIG. 6, when the Pcell and the Scell use the same UAG-b, PUSCH-1 and PUSCH-2 under the Pcell and PUSCH-1 and PUSCH-2 under the Scell use the same spatial relationship information, that is, no conflict occurs, and therefore the transmission can be performed normally. However, a PUCCH-1/2 of the Pcell and a PUSCH-1/2 of the Scell need to use different spatial relationship information under the UAG-b, which exceeds the capability of the UE end. Sounding reference signal (SRS).

When it is assumed that the priority criterion is "an uplink data channel has priority over an uplink control channel", PUCCH-1 and PUCCH-2 need to comply with the spatial relationship of the PUSCH-1/2 transmitted at the same time. That is, the spatial relationship information of the PUCCH-1 and the PUCCH-2 needs to be modified to {[Beam-2, UAG-b]}.

Figure 7:
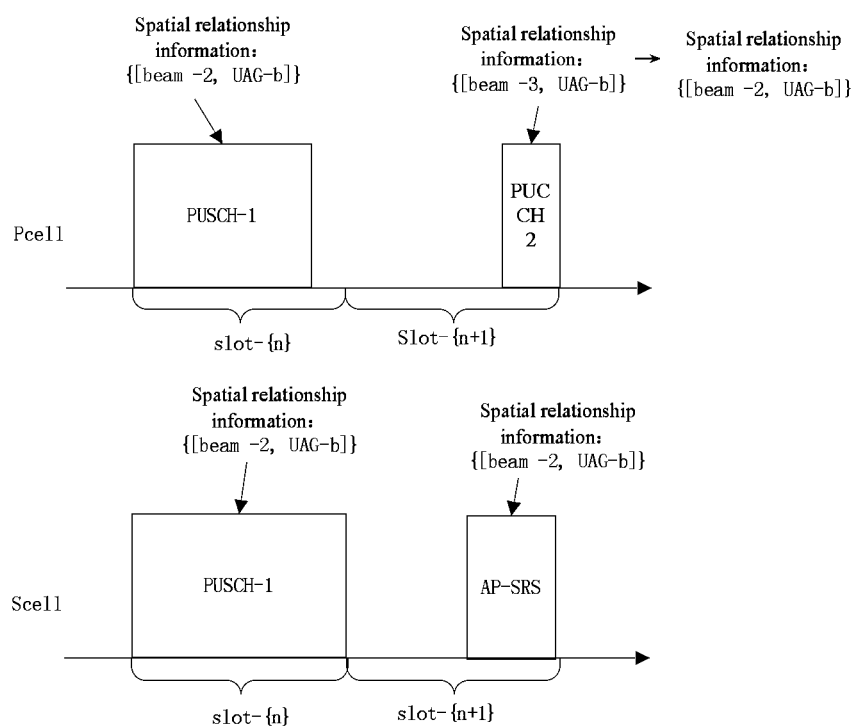
FIG. 7 is a schematic diagram of a collision of spatial relationship information of a sounding reference signal and a physical layer uplink control channel according to an embodiment of the present disclosure.

FIG. 7 is a schematic diagram of a collision of spatial relationship information of a sounding reference signal and a physical layer uplink control channel according to some embodiments of the present disclosure. As shown in FIG. 7, The aperiodic (AP)-SRS and PUCCH-2 need to be transmitted at the same time, but have different spatial relationship information, i.e. {[Beam-2, UAG-b]}} and {[Beam-3, UAG-b]}, under the same group (UAG-b).

When it is assumed that the priority criterion is "an uplink reference signal has priority over an uplink control channel" (or "a non-periodic uplink reference signal has priority over an uplink control channel"), the PUCCH2 needs to comply with the spatial relationship of the AP-SRS transmitted at the same time. That is, the spatial relationship information of the PUCCH-2 needs to be modified to {[Beam-2, UAG-b]}, or the spatial filter of the PUCCH-2 is determined according to the spatial relationship information {[Beam-2, UAG-b]}.

Figure 8:
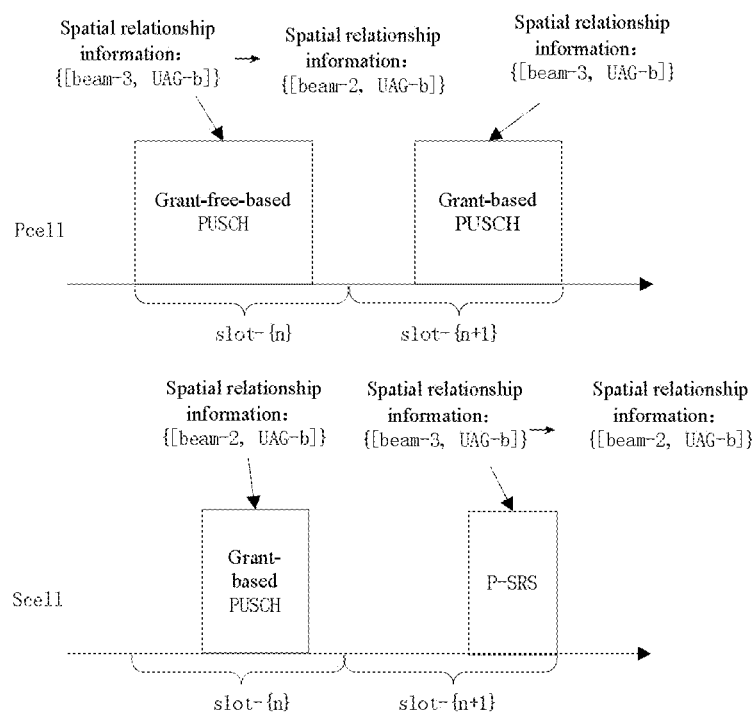
FIG. 8 is a schematic diagram of a collision of spatial relationship information during grant and grant-free transmission according to an embodiment of the present disclosure.

FIG. 8 is a schematic diagram of a collision of spatial relationship information during grant and grant-free transmission according to some embodiments of the present disclosure. As shown in FIG. 8, at the same group, the spatial relationship of Pcell and Scell transmission conflicts.

In a Slot-n, according to the priority criterion "a grant-based uplink data channel has priority over a grant-free-based uplink data channel", the spatial relationship information under grant-free PUSCH is modified to {[Beam-2, UAG-b]}.

In a Slot-n, according to another priority criterion "an uplink data channel has priority over an uplink reference signal", the spatial relationship of the periodic SRS is modified to {[Beam-2, UAG-b]}, or the spatial filter of the periodic SRS is determined according to the spatial relationship {[Beam-2, UAG-b] of the grant-based PUSCH of the Pcell.

By means of the technical solution, according to the capability, fed back by a UE end, of sending reference signals or channels at the same time, and restriction information, which may be supported by the base station end configuration, of sending reference signals or channels at the same time, uplink beam training under simultaneous transmission of uplink multiple beams is designated, the spatial relationship of solving the low-priority reference signals or channels after collision by a pre-configured constraint criteria is overlapped, so as to satisfy the requirements of the capability of the UE end and the configuration of the base station end, thereby improving the utilization efficiency of the transmission-end wave beams and antenna resources.

Through the above description of the embodiments, it should be clearly appreciated by the person skilled in the art that the method of the embodiments above may be implemented by means of software in connection with the required universal hardware platform, and of course, can also be implemented by hardware, but in many cases the former is a more preferred implementation. Based on this understanding, the essence of the technical solution of the present disclosure or the contributions to current technologies under the present disclosure may be implemented in the form of software products. Such software product may be stored in a computer storage medium (such as a ROM/RAM, a magnetic disk and an optical disk) and include several instructions to request a terminal device (such as a cell phone, a computer, a server, or a network device) to implement methods of the embodiments of the present disclosure.

Embodiment Two

In some embodiments of the present disclosure, also provided is a device for transmitting an information element, the device is used for implementing the embodiments and preferred embodiments above, and what has been described will not be described repeatedly here. As used below, the term "module" may implement a combination of software and/or hardware of a predetermined function. Although the device described in the following embodiments is preferably implemented by software, implementation of hardware or a combination of software and hardware is also possible and conceived.

According to some other embodiments of the present disclosure, a device for transmitting an information element is further provided, and the device comprises:

a receiving module, configured to receive spatial relationship information transmitted by a second communication node and configured for multiple uplink information elements; and a first transmission module, configured to the multiple uplink information elements according to the spatial relationship information.

According to the technical solution above, a first communication node receives spatial relationship information configured for multiple uplink information elements and transmitted by a second communication node, and transmits the multiple uplink information elements according to the spatial relationship information, By means of the technical solution, uplink information elements are transmitted according to spatial relationship information configured by the second communication node, the problem in the related art that a collision exists when uplink information elements are transmitted is solved, and as the second communication node uniformly sets the transmitted spatial relationship information, the collision between uplink information elements is reduced, and the utilization efficiency of the transceiver and antenna resources is improved.

In an embodiment, the uplink information elements comprise at least one of the following: an uplink reference signal, an uplink data channel and an uplink control channel.

In an embodiment, when the uplink information element is an uplink data channel, the spatial relationship information comprises at least one of the following: spatial relationship information configured for an uplink reference signal associated with the uplink data channel; and spatial relationship information configured for an uplink control channel associated with the uplink data channel.

In an embodiment, the multiple uplink information elements have at least one of features:

the multiple uplink information elements being transmitted at the same time, which can be understood as that multiple uplink information elements are sent at the same time;

the multiple uplink information elements being associated with the same time unit; and the time units associated with the multiple uplink information elements partially or fully overlapping;

the time unit is an OFDM symbol, a sub-OFDM symbol, or a slot.

In an embodiment, when the parameter X of the uplink information element is greater than a threshold, the first transmission module is configured to transmit the multiple uplink information elements according to the spatial relationship information, comprising:

processing the multiple uplink information elements according to a priority criterion, and the operation of processing the multiple uplink information elements according to the priority criterion comprises at least one of the following:

the spatial relationship of low-priority uplink information elements being overlapped into a specific spatial relationship;

the spatial relationship of all the uplink information elements being overlapped into a specific spatial relationship;

the low-priority uplink information elements being transmitted by a specific spatial filter;

the spatial relationship of all the uplink information elements being transmitted by the specific spatial filter; and the low-priority uplink information elements being not transmitted;

the parameter X being an integer.

In an embodiment, the parameter X of the uplink information element comprises at least one of the following:

the number of spatial relationships associated with the uplink information elements;

the number of different spatial relationships associated with the uplink information elements;

the number of spatial relationships of the same group associated with the uplink information elements;

the maximum number of spatial relationships of the same group associated with the uplink information elements;

the number of groups associated with the uplink information elements; and the number of different groups associated with the uplink information element, which may have the same meaning as the number of groups associated with the uplink information elements.

In an embodiment, the parameter X of the uplink information element comprises at least one of the following:

the number of spatial filters associated with the uplink information elements;

the number of different spatial filters associated with the uplink information elements;

the number of spatial filters of the same group associated with the uplink information elements; and the maximum number of spatial filters of the same group associated with the uplink information elements.

In an embodiment, after the multiple uplink information elements are processed according to the priority criterion, it is determined that the parameter X is less than or equal to the threshold.

In an embodiment, the specific spatial relationship may comprise at least one of the following:

a spatial relationship pre-configured by a high layer;

a spatial relationship of high-priority uplink information elements;

a spatial relationship of a lowest index, a highest index or N predefined indexes among preset indexes;

a spatial relationship of primary carrier indexes or primary cell indexes;

a spatial relationship of a lowest index, a highest index, or M predefined indexes among preset indexes associated with the low-priority uplink information elements;

a spatial relationship of primary carriers or primary cells associated with the low-priority uplink information elements;

a spatial relationship associated with a lowest index, a highest index or P pre-defined indexes among the preset indexes associated with a group associated with the low-priority uplink information elements;

a spatial relationship associated with a primary carrier or a primary cell and associated with a group associated with the low-priority uplink information elements;

a spatial relationship of high-priority uplink information elements associated with a same group with the low-priority uplink information elements;

a spatial relationship associated with a reference signal (RS) in spatial relationship information of the low-priority uplink information elements; and a spatial relationship associated with a RS in spatial relationships of the information elements;

the preset index comprising at least one of the following: a cell index, a carrier index, a Bandwidth part (BWP) index, a control channel resource set index and a control channel resource index, and N, M and P are positive integers greater than or equal to 1.

In an embodiment, a spatial relationship of the low-priority uplink information elements is associated with a group index Y, in a case of the low-priority uplink information elements, the number of spatial relationships associated with the group index Y is greater than the threshold; or in a case of the low-priority uplink information elements, the number of different spatial relationships associated with the group index Y is greater than the threshold;

Y is an integer.

In an embodiment, the specific spatial filter may comprise at least one of the following:

a spatial filter pre-configured by a high layer;

a spatial filter used by high-priority uplink information elements;

a spatial filter of a lowest index, a highest index, or Q predefined indexes among the preset indexes;

a spatial filter of a primary carrier index or a primary cell index;

a spatial filter of a lowest index, a highest index or R predefined indexes among preset indexes associated with the low-priority uplink information elements;

a spatial filter of a primary carrier index or primary cell index associated with the low-priority uplink information elements;

a spatial filter associated with a lowest index, a highest index or S pre-defined indexes among preset indexes associated with a group associated with the low-priority uplink information elements;

a spatial filter associated with a primary carrier index or a primary cell index and associated with a group associated with the low-priority uplink information elements;

a spatial filter of high-priority uplink information elements associated with a same group with the low-priority uplink information elements;

a spatial filter associated with a RS in spatial relationship information of the low-priority uplink information elements;

a spatial filter associated with a reference signal in spatial relationships with the information elements;

the preset index comprising at least one of the following: a cell index, a carrier index, a Bandwidth part (BWP) index, a control channel resource set index and a control channel resource index, and R, Q, S being positive integers greater than or equal to 1.

In an embodiment, a spatial filter of the low-priority uplink information elements is associated with a group index W, in a case of the low-priority uplink information elements, the number of spatial filters associated with the group index W is greater than the threshold; or in a case of the low-priority uplink information elements, the number of different spatial filters associated with the group index W is greater than the threshold, W is an integer.

In an embodiment, the threshold comprises one of the following: 1, 2, 3 and 4.

In an embodiment, the threshold is determined according to capability information and/or configuration information of the first communication node, the configuration information being configured by the second communication node.

In an embodiment, the priority criterion may comprise at least one of the following:

an uplink data channel has priority over an uplink reference signal;

an uplink data channel has priority over an uplink control channel;

a multi-slot uplink data channel has priority over an uplink control channel;

a multi-slot uplink data channel has priority over an uplink reference signal;

an uplink reference signal has priority over an uplink control channel;

a grant-based uplink data channel has priority over a grant-free-based uplink data channel; and the information elements under the primary cell or primary carrier taking precedence over the information elements under the secondary cell or secondary carrier.

In an embodiment, the priority criterion may comprise at least one of the following:

the uplink control channel has priority over the uplink reference signal;

the uplink control channel has priority over the uplink data channel;

the uplink reference signal has priority over the uplink data channel; and the grant-based uplink data channel has priority over the grant-free-based uplink data channel.

In an embodiment, the priority criterion may comprise at least one of the following:

an aperiodic uplink information element has priority over a periodic uplink information element;

the aperiodic uplink information element has priority over a semi-persistent uplink information element;

the semi-persistent uplink information element has priority over the periodic uplink information element.

In an embodiment, the priority criterion may comprise at least one of the following:

determining the priority of an uplink information element according to a reference signal index;

determining the priority of an uplink information element according to a control channel resource set index;

determining the priority of an uplink information element according to a type or a sequence number of an RNTI; and determining the priority of an uplink information element according to a BWP index, a carrier index or a cell index.

According to some other embodiments of the present disclosure, further provided is a device for transmitting information, comprising:

a determining module, configured to determine spatial relationship information configured for multiple uplink elements of a first communication node; and a second transmission module, configured to transmit the spatial relationship information to the first communication node.

By means of the technical solution, the problem in the related art that a collision exists when uplink information elements are transmitted is solved, and as the second communication node uniformly sets the transmitted spatial relationship information, the collision between uplink information elements is reduced, and the utilization efficiency of the transceiver and antenna resources is improved.

In an embodiment, the uplink information elements include at least one of the following: an uplink reference signal, an uplink data channel and an uplink control channel.

In an embodiment, when the uplink information element is an uplink data channel, the spatial relationship information comprises at least one of the following: spatial relationship information configured for an uplink reference signal associated with the uplink data channel; and spatial relationship information configured for an uplink control channel associated with the uplink data channel.

In an embodiment, the multiple uplink information elements have at least one of features: transmitting the multiple uplink information elements at the same time; the multiple uplink information elements being associated with the same time unit; and the time units associated with the multiple uplink information elements partially or fully overlapping, the time unit is an orthogonal frequency division multiplexing (OFDM) symbol, or a sub-orthogonal frequency division multiplexing (sub-OFDM) symbol, or a sub-frame slot.

It should be noted that the modules above may be implemented by software or hardware, and the latter may be implemented in the following manner, but is not limited thereto: the modules are located in the same processor; or the modules are located in different processors in an arbitrary combination.

Embodiment Three

According to some other embodiments of the present disclosure, a terminal is further provided, and the terminal comprises:

a communication device, configured to receive spatial relationship information transmitted by a second communication node and configured for multiple uplink information elements; and a processor, configured to transmit the multiple uplink information elements according to the spatial relationship information.

A first communication node receives spatial relationship information configured for multiple uplink information elements and transmitted by a second communication node, and transmits the multiple uplink information elements according to the spatial relationship information, By means of the technical solution, uplink information elements are transmitted according to spatial relationship information configured by the second communication node, the problem in the related art that a collision exists when uplink information elements are transmitted is solved, and as the second communication node uniformly sets the transmitted spatial relationship information, the collision between uplink information elements is reduced, and the utilization efficiency of the transceiver and antenna resources is improved.

In an embodiment, the uplink information elements comprise at least one of the following: an uplink reference signal, an uplink data channel and an uplink control channel.

In an embodiment, when the uplink information element is an uplink data channel, the spatial relationship information comprises at least one of the following: spatial relationship information configured for an uplink reference signal associated with the uplink data channel; and spatial relationship information configured for an uplink control channel associated with the uplink data channel.

In an embodiment, the multiple uplink information elements have at least one of features:

the multiple uplink information elements being transmitted at the same time, which can be understood as that the multiple uplink information elements are sent simultaneously;

the multiple uplink information elements being associated with the same time unit; and the time units associated with the multiple uplink information elements partially or fully overlapping;

the time unit is an orthogonal frequency division multiplexing (OFDM) symbol, or a sub-OFDM symbol, or a sub-frame slot.

In an embodiment, when the parameter X of the uplink information element is greater than a threshold, the processor transmitting the multiple uplink information elements according to the spatial relationship information comprises:

processing the multiple uplink information elements according to a priority criterion, and the operation of processing the multiple uplink information elements according to the priority criterion comprises at least one of the following:

the spatial relationships of low-priority uplink information elements being overlapped into a specific spatial relationship;

the spatial relationship of all the uplink information elements being overlapped into a specific spatial relationship;

the low-priority uplink information elements being transmitted by a specific spatial filter;

the spatial relationship of all the uplink information elements being transmitted by the specific spatial filter; and the low-priority uplink information elements being not transmitted;

the parameter X being an integer.

In an embodiment, the parameter X of the uplink information element comprises at least one of the following:

the number of spatial relationships associated with the uplink information elements;

the number of different spatial relationships associated with the uplink information elements;

the number of spatial relationships of the same group associated with the uplink information elements;

the maximum number of spatial relationships of the same group associated with the uplink information elements;

the number of groups associated with the uplink information elements; and the number of different groups associated with the uplink information element, which may have the same meaning as the number of groups associated with the uplink information elements.

In an embodiment, the parameter X of the uplink information element comprises at least one of the following:

the number of spatial filters associated with the uplink information elements;

the number of different spatial filters associated with the uplink information elements;

the number of spatial filters of the same group associated with the uplink information elements; and the maximum number of spatial filters of the same group associated with the uplink information elements.

In an embodiment, after the multiple uplink information elements are processed according to the priority criterion, it is determined that the parameter X is less than or equal to the threshold.

In an embodiment, the specific spatial relationship may comprise at least one of the following:

a spatial relationship pre-configured by a high layer;

a spatial relationship of high-priority uplink information elements;

a spatial relationship of a lowest index, a highest index or N predefined indexes among preset indexes;

a spatial relationship of primary carrier indexes or primary cell indexes;

a spatial relationship of a lowest index, a highest index, or M predefined indexes among preset indexes associated with the low-priority uplink information elements;

a spatial relationship of primary carriers or primary cells associated with the low-priority uplink information elements;

a spatial relationship associated with a lowest index, a highest index or P pre-defined indexes among the preset indexes associated with a group associated with the low-priority uplink information elements;

a spatial relationship associated with a primary carrier or a primary cell associated with a group associated with the low-priority uplink information elements;

a spatial relationship of high-priority uplink information elements associated with a same group with the low-priority uplink information elements;

a spatial relationship associated with a reference signal (RS) in spatial relationship information of the low-priority uplink information elements; and a spatial relationship associated with a RS in spatial relationships of the information elements;

the preset index comprising at least one of the following: a cell index, a carrier index, a Bandwidth part (BWP) index, a control channel resource set index and a control channel resource index, and N, M and P are positive integers greater than or equal to 1.

In an embodiment, a spatial relationship of the low-priority uplink information elements is associated with a group index Y, in a case of the low-priority uplink information elements, the number of spatial relationships associated with the group index Y is greater than the threshold; or in a case of the low-priority uplink information elements, the number of different spatial relationships associated with the group index Y is greater than the threshold, Y is an integer.

In an embodiment, the specific spatial relationship may include at least one of the following:

a spatial filter pre-configured by a high layer;

a spatial filter used by high-priority uplink information elements;

a spatial filter of a lowest index, a highest index, or Q predefined indexes among the preset indexes;

a spatial filter of a primary carrier index or a primary cell index;

a spatial filter of a lowest index, a highest index or R predefined indexes among preset indexes associated with the low-priority uplink information elements;

a spatial filter of a primary carrier index or primary cell index associated with the low-priority uplink information elements;

a spatial filter associated with a lowest index, a highest index or S pre-defined indexes among preset indexes associated with a group associated with the low-priority uplink information elements;

a spatial filter associated with a primary carrier index or a primary cell index and associated with a group associated with the low-priority uplink information elements;

a spatial filter of high-priority uplink information elements associated with a same group with the low-priority uplink information elements;

a spatial filter associated with a RS in spatial relationship information of the low-priority uplink information elements;

a spatial filter associated with a reference signal in spatial relationships with the information elements;

the preset index comprising at least one of the following: a cell index, a carrier index, a Bandwidth part (BWP) index, a control channel resource set index and a control channel resource index, and R, Q, S being positive integers greater than or equal to 1.

In an embodiment, a spatial filter of the low-priority uplink information elements is associated with a group index W, in a case of the low-priority uplink information elements, the number of spatial filters associated with the group index W is greater than the threshold; or in a case of the low-priority uplink information elements, the number of different spatial filters associated with the group index W is greater than the threshold;

W is an integer.

In an embodiment, the threshold comprises one of the following: 1, 2, 3 and 4.

In an embodiment, the threshold is determined according to capability information and/or configuration information of the first communication node, the configuration information being configured by the second communication node.

In an embodiment, the priority criterion may comprise at least one of the following:

an uplink data channel has priority over an uplink reference signal;

an uplink data channel has priority over an uplink control channel;

a multi-slot uplink data channel has priority over an uplink control channel;

a multi-slot uplink data channel has priority over an uplink reference signal;

an uplink reference signal has priority over an uplink control channel;

a grant-based uplink data channel has priority over a grant-free-based uplink data channel; and the information elements under the primary cell or primary carrier taking precedence over the information elements under the secondary cell or secondary carrier.

In an embodiment, the priority criterion may comprise at least one of the following:

an uplink control channel has priority over an uplink reference signal;

an uplink control channel has priority over an uplink data channel;

an uplink reference signal has priority over an uplink data channel; and a grant-based uplink data channel has priority over a grant-free-based uplink data channel.

In an embodiment, the priority criterion may comprise at least one of the following:

an aperiodic uplink information element has priority over a periodic uplink information element;

an aperiodic uplink information element has priority over a semi-persistent uplink information element;

a semi-persistent uplink information element has priority over a periodic uplink information element.

In an embodiment, the priority criterion may comprise at least one of the following:

determining the priority of an uplink information element according to a reference signal index;

determining the priority of an uplink information element according to a control channel resource set index;

determining the priority of an uplink information element according to a type or a sequence number of a radio network temporary identifier (RNTI); and determining the priority of an uplink information element according to a bandwidth part (BWP) index, a carrier index or a cell index.

Embodiment Four

Some embodiments of the present disclosure further provide a storage medium. In an embodiment, in the present embodiments, the storage medium may be configured to store program codes for executing the following steps:

S1, receiving, by a first communication node, spatial relationship information transmitted by a second communication node and configured for multiple uplink information elements; and S2, transmitting the multiple uplink information elements according to the spatial relationship information.

In an embodiment, in the embodiments, the storage medium may include, but is not limited to, any medium that can store program codes, such as a USB flash disk, a read-only memory (ROM), a random access memory (RAM), a removable hard disk, a magnetic disk, or an optical disk.

Some embodiments of the present disclosure also provide an electronic device, comprising a memory and a processor, the memory stores a computer program, and the processor is configured to run the computer program, so as to execute the steps in any one of the method embodiments.

In an embodiment, the electronic device can further comprise a transmission device and an input/output device, the transmission device is connected to the processor, and the input/output device is connected to the processor.

In an embodiment, in the embodiments, the processor may be configured to execute the following steps by means of a computer program:

S1, receiving, by a first communication node, spatial relationship information transmitted by a second communication node and configured for multiple uplink information elements; and S2, transmitting the multiple uplink information elements according to the spatial relationship information.

In an embodiment, for exemplary examples in the embodiments, reference may be made to the examples described in the embodiments and optional embodiments, and details are not repeatedly described herein.

In an embodiment, for exemplary examples in the embodiments, reference may be made to the examples described in the embodiments and optional embodiments, and details are not repeatedly described herein.

Obviously, those skilled in the art should understand that the modules or steps in some embodiments of the present disclosure can be implemented by using a general computing device, and they can be integrated in a single computing device, and can also be distributed over a network consisting of multiple computing devices. In an embodiment, they may be implemented by using executable program codes of the computing devices. Thus, they can be stored in a storage device and executed by the computing devices. Furthermore, in some cases, the shown or described steps may be executed in an order different from that described here, or they can be respectively implemented by individual Integrated Circuit modules, or they can be implemented by making multiple the modules or steps into a single Integrated Circuit module. Thus, the present disclosure is not limited to any particular combination of hardware and software.

The aforementioned are merely preferred embodiments of the present disclosure are not used to limit the present disclosure, and to those skilled in the art, various modifications and variations may be available for the present disclosure. Any modification, equivalent replacement, improvements, if under the spirit and principle of this disclosure, shall be included in the scope of protection of this disclosure.

What is claimed is:

1. A method for transmitting an information element, comprising:

receiving, by a first communication node, spatial relationship information transmitted by a second communication node, and the spatial relationship information is configured for multiple uplink information elements; and transmitting, by first communication node, the multiple uplink information elements according to the spatial relationship information;

when a parameter X of the uplink information element is greater than a threshold, transmitting the multiple uplink information elements according to the spatial relationship information comprises:

processing the multiple uplink information elements according to a priority criterion, and processing the multiple uplink information elements according to the priority criterion comprises at least one of the following:

the spatial relationship of a low-priority uplink information element being overlapped into a specific spatial relationship;

the spatial relationships of all the uplink information elements being overlapped into a specific spatial relationship;

the low-priority uplink information element being transmitted by a specific spatial filter;

the spatial relationships of all the multiple uplink information elements being transmitted by the specific spatial filter; and the low-priority uplink information elements being not transmitted;

wherein the parameter X being an integer.

2. The method according to claim 1, the multiple uplink information elements comprise at least one of the following: an uplink reference signal, an uplink data channel and an uplink control channel.

3. The method according to claim 1, when the multiple uplink information element are uplink data channels, the spatial relationship information comprising at least one of the following:

spatial relationship information configured for an uplink reference signal associated with the uplink data channel; and spatial relationship information configured for an uplink control channel associated with the uplink data channel.

4. The method according to claim 1, the multiple uplink information elements have at least one of the following features:

the multiple uplink information elements being transmitted at a same time;

the multiple uplink information elements being associated with a same time unit; and the time units associated with the multiple uplink information elements partially or fully overlapping;

the time unit is an orthogonal frequency division multiplexing (OFDM) symbol, or a sub-orthogonal frequency division multiplexing (sub-OFDM) symbol, or a slot.

5. The method according to claim 1, the parameter X of the uplink information element comprises at least one of the following:

a number of spatial relationships associated with the uplink information elements;

a number of different spatial relationships associated with the uplink information elements;

a number of spatial relationships of the same group associated with the uplink information elements;

a maximum number of spatial relationships of the same group associated with the uplink information elements;

a number of groups associated with the uplink information elements; and a number of different groups associated with the uplink information elements.

6. The method according to claim 1, the parameter X of the uplink information element comprises at least one of the following:

a number of spatial filters associated with the uplink information elements;

a number of different spatial filters associated with the uplink information elements;

a number of spatial filters of the same group associated with the uplink information elements; and a maximum number of spatial filters of the same group associated with the uplink information elements.

7. The method according to claim 1, after processing the multiple uplink information elements according to the priority criterion, the method further comprises:

determining that the parameter X is less than or equal to the threshold.

8. The method according to claim 1, the specific spatial relationship comprises at least one of the following:

a spatial relationship pre-configured by a high layer;

a spatial relationship of a high-priority uplink information element of the multiple uplink information elements;

a spatial relationship of a lowest index, a highest index or N predefined indexes among preset indexes;

a spatial relationship of a primary carrier index or a primary cell index;

a spatial relationship of a lowest index, a highest index, or M predefined indexes among preset indexes associated with low-priority uplink information elements of the multiple uplink information elements;

a spatial relationship of primary carriers or primary cells associated with the low-priority uplink information elements;

a spatial relationship associated with a lowest index, a highest index or P pre-defined indexes among the preset indexes associated with a group associated with the low-priority uplink information elements;

a spatial relationship associated with a primary carrier or a primary cell associated with a group associated with the low-priority uplink information elements;

a spatial relationship of high-priority uplink information elements associated with a same group with the low-priority uplink information elements;

a spatial relationship associated with a reference signal (RS) in spatial relationship information of the low-priority uplink information elements; and a spatial relationship associated with a reference signal in spatial relationships of the multiple uplink information elements;

wherein the preset index comprising at least one of the following: a cell index, a carrier index, a Bandwidth part (BWP) index, a control channel resource set index and a control channel resource index;

wherein N, M and P being positive integers greater than or equal to 1.

9. The method according to claim 1, a spatial relationship of the low-priority uplink information elements is associated with a group index Y, in a case of the low-priority uplink information elements of the multiple uplink information elements, a number of spatial relationships associated with the group index Y being greater than the threshold; or, in a case of the low-priority uplink information elements, a number of different spatial relationships associated with the group index Y being greater than the threshold;

wherein Y being an integer.

10. The method according to claim 1, the specific spatial filter comprises at least one of the following:

a spatial filter pre-configured by a high layer of the multiple uplink information elements;

a spatial filter used by high-priority uplink information elements of the multiple uplink information elements;

a spatial filter of a lowest index, a highest index, or Q predefined indexes among the preset indexes;

a spatial filter of a primary carrier index or a primary cell index;

a spatial filter of a lowest index, a highest index or R predefined indexes among preset indexes associated with the low-priority uplink information elements;

a spatial filter of a primary carrier index or primary cell index associated with the low-priority uplink information elements of the multiple uplink information elements;

a spatial filter associated with a lowest index, a highest index or S pre-defined indexes among preset indexes associated with a group associated with the low-priority uplink information elements;

a spatial filter associated with a primary carrier index or a primary cell index and associated with a group associated with the low-priority uplink information elements;

a spatial filter of high-priority uplink information elements associated with a same group with the low-priority uplink information elements;

a spatial filter associated with a reference signal in spatial relationship information of the low-priority uplink information elements;

a spatial filter associated with a reference signal in spatial relationships with the information elements;

wherein the preset index comprising at least one of the following: a cell index, a carrier index, a Bandwidth part (BWP) index, a control channel resource set index and a control channel resource index;

wherein R, Q and S are positive integers greater than or equal to 1.

11. The method according to claim 1, a spatial filter of the low-priority uplink information elements is associated with a group index W, and in a case of low-priority uplink information elements of the multiple uplink information elements, a number of spatial filters associated with the group index W is greater than a threshold; or in a case of the low-priority uplink information elements, a number of different spatial filters associated with the group index W is greater than the threshold;

wherein W being an integer.

12. The method according to claim 1, the threshold comprises one of the following: 1, 2, 3 and 4.

13. The method according to claim 1, the method further comprises:

determining the threshold according to capability information and/or configuration information of the first communication node, the configuration information being configured by the second communication node.

14. The method according to claim 1, the priority criterion comprises at least one of the following:

an uplink data channel has priority over an uplink reference signal;

an uplink data channel has priority over an uplink control channel;

a multi-slot uplink data channel has priority over an uplink control channel;

a multi-slot uplink data channel has priority over an uplink reference signal;

an uplink reference signal has priority over an uplink control channel;

a grant-based uplink data channel has priority over a grant-free-based uplink data channel; and the multiple uplink information elements under the primary cell or primary carrier taking precedence over the information elements under the secondary cell or secondary carrier;

or, the priority criterion comprises at least one of the following:

the uplink control channel has priority over the uplink reference signal;

the uplink control channel has priority over the uplink data channel;

the uplink reference signal has priority over the uplink data channel; and the grant-based uplink data channel has priority over the grant-free-based uplink data channel;

or, the priority criterion comprises at least one of the following:

an aperiodic uplink information element has priority over a periodic uplink information element of the multiple uplink information elements;

the aperiodic uplink information element has priority over a semi-persistent uplink information element of the multiple uplink information elements; and the semi-persistent uplink information element has priority over the periodic uplink information element of the multiple uplink information elements, or, the priority criterion comprises at least one of the following:

determining a priority of an uplink information element according to a reference signal index;

determining a priority of an uplink information element according to a control channel resource set index;

determining a priority of an uplink information element according to a type or a sequence number of a radio network temporary identifier; and determining a priority of an uplink information element according to a bandwidth part index, a carrier index or a cell index.

15. A method for transmitting information, comprising:

determining, by a second communication node, spatial relationship information configured for multiple uplink elements of a first communication node; and transmitting, by the second communication node, the spatial relationship information to the first communication node;

transmitting, by the first communication node, the multiple uplink information elements according to the spatial relationship information;

when a parameter X of the uplink information element is greater than a threshold, transmitting the multiple uplink information elements according to the spatial relationship information comprises:

processing the multiple uplink information elements according to a priority criterion, and processing the multiple uplink information elements according to the priority criterion comprises at least one of the following:

the spatial relationship of a low-priority uplink information element being overlapped into a specific spatial relationship;

the spatial relationships of all the uplink information elements being overlapped into a specific spatial relationship;

the low-priority uplink information element being transmitted by a specific spatial filter;

the spatial relationships of all the multiple uplink information elements being transmitted by the specific spatial filter; and the low-priority uplink information elements being not transmitted;

wherein the parameter X being an integer.

16. The method according to claim 15, the multiple uplink information elements comprise at least one of the following: an uplink reference signal, an uplink data channel and an uplink control channel.

17. The method according to claim 15, when the multiple uplink information elements are uplink data channels, the spatial relationship information comprising at least one of the following:

spatial relationship information configured for an uplink reference signal associated with the uplink data channel; and spatial relationship information configured for an uplink control channel associated with the uplink data channel.

18. The method according to claim 15, the multiple uplink information elements have at least one of the following features:

the multiple uplink information elements being transmitted at a same time;

the multiple uplink information elements being associated with a same time unit; and the time units associated with the multiple uplink information elements partially or fully overlapping;

the time unit is an orthogonal frequency division multiplexing (OFDM) symbol, or a sub-orthogonal frequency division multiplexing (sub-OFDM) symbol, or a sub-frame slot.

19. A device for transmitting information, used to perform the method as claimed in claim 15, the device comprising:

a determining module, configured to determine spatial relationship information configured for multiple uplink elements of a first communication node; and a transmission module, configured to transmit the spatial relationship information to the first communication node.

20. A device for transmitting an information element, applied to a first communication node, comprising:

a receiving module, configured to receive spatial relationship information transmitted by a second communication node, and the spatial relationship information is configured for multiple uplink information elements; and a transmission module, configured to transmit the multiple uplink information elements according to the spatial relationship information;

when a parameter X of the uplink information element is greater than a threshold, transmitting the multiple uplink information elements according to the spatial relationship information comprises:

processing the multiple uplink information elements according to a priority criterion, and processing the multiple uplink information elements according to the priority criterion comprises at least one of the following:

the spatial relationship of a low-priority uplink information element being overlapped into a specific spatial relationship;

the spatial relationships of all the uplink information elements being overlapped into a specific spatial relationship;

the low-priority uplink information element being transmitted by a specific spatial filter;

the spatial relationships of all the multiple uplink information elements being transmitted by the specific spatial filter; and the low-priority uplink information elements being not transmitted;

wherein the parameter X being an integer.

* * * * *